Nov. 25, 1952 I. JEPSON ET AL 2,619,560
ANTICHATTER SWITCH DEVICE
Filed March 26, 1945 4 Sheets-Sheet 1

INVENTORS
IVAR JEPSON
LUDVIK J. KOCI
BY
ATTORNEYS

Nov. 25, 1952     I. JEPSON ET AL     2,619,560
ANTICHATTER SWITCH DEVICE
Filed March 26, 1945     4 Sheets-Sheet 2

INVENTORS
IVAR JEPSON
LUDVIK J. KOCI
BY
ATTORNEYS

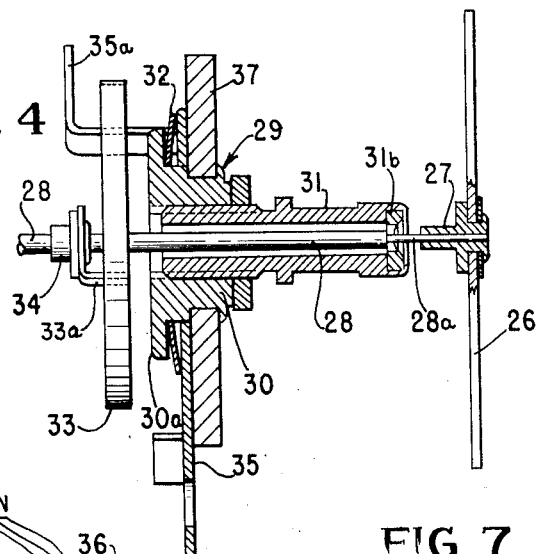
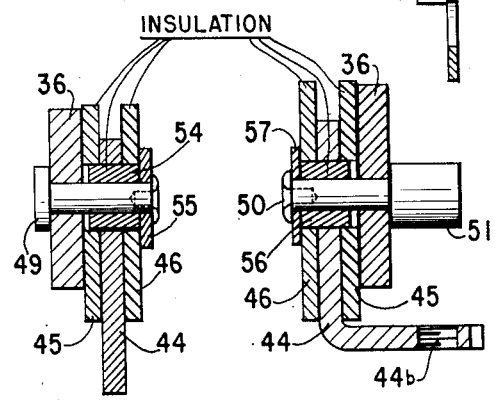
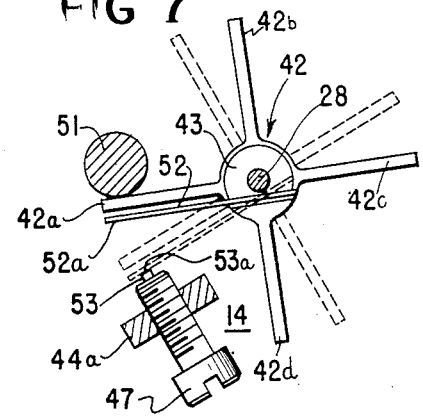
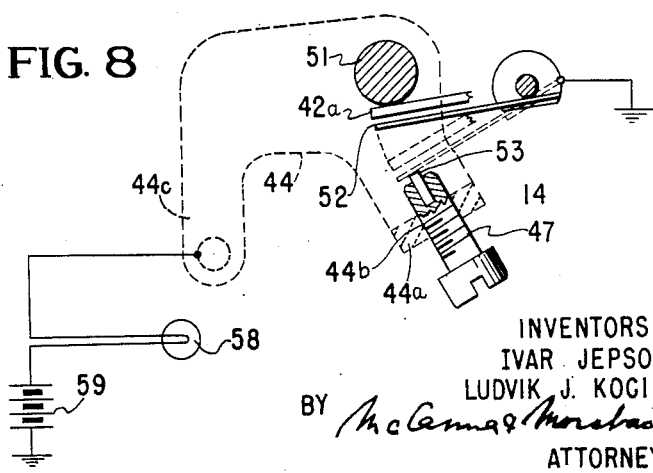
INVENTORS
IVAR JEPSON
LUDVIK J. KOCI
BY McCanna & Morsbach
ATTORNEYS Nov. 25, 1952 — I. JEPSON ET AL — 2,619,560
ANTICHATTER SWITCH DEVICE
Filed March 26, 1945 — 4 Sheets-Sheet 4

INVENTORS
IVAR JEPSON
LUDVIK J. KOCI
BY *McCanna & Morsbach*
ATTORNEYS

Patented Nov. 25, 1952

2,619,560

UNITED STATES PATENT OFFICE 2,619,560

ANTICHATTER SWITCH DEVICE

Ivar Jepson, Oak Park, and Ludvik J. Koci, Riverside, Ill., assignors to Sunbeam Corporation, Chicago, Ill., a corporation of Illinois Application March 26, 1945, Serial No. 584,978

6 Claims. (Cl. 200—52)

The present invention relates to speed indicating devices and more particularly to an improved device for automatically closing a speed indicating circuit when a predetermined speed is measured by the device and for automatically opening the circuit when the measured speed deviates in one sense from the predetermined speed.

In certain applications requiring speed measurement, it is desirable to provide as an adjunct to the conventional speed indicating scale and pointer assembly, a suitable electrical indicating circuit which is automatically controlled to provide a visual or audible indication representing a predetermined measured speed. Such facilities are usually provided in aircraft tachometers where, in the interests of greater reliability, separate and independently operated mechanisms are provided for respectively controlling the scale and pointer assembly and the speed indicating circuit. Due to the reliability required in the operation of the speed indicating circuit, the use of auxiliary relay or power amplifying means is not desirable. Also, in an application of the specific character mentioned, vibration produced by engine operation in the craft in which the speed indicating device is installed, gives rise to a number of difficult problems in obtaining accurate and reliable control of the speed indicating circuit. Specifically, such vibration of the craft is unavoidably transmitted to the working parts of the circuit control mechanism, with the result that chattering of the circuit control contacts is produced if no contact holding bias is applied to sustain engagement of the contacts after they are brought into engagement at the predetermined measured speed. On the other hand, if such contact holding bias is supplied, the contacts may be held in engagement long after the measured speed has substantially departed from the predetermined speed in the correct sense to produce disengagement of the contacts, with the result that a false indication is provided by the indicating circuit.

It is an object of the present invention, therefore, to provide improved facilities for controlling a speed indicating or control circuit in which the above-mentioned difficulties are obviated in a fully satisfactory manner.

It is another object of the present invention to provide improved facilities of the character described in which chattering of the circuit control contacts, when engaged, is positively prevented, and separation of the contacts is reliably obtained when the measured speed departs a relatively small speed increment from the predetermined speed at which the contacts are engaged.

The invention, both as to its organization and method of operation, together with further objects and advantages thereof, will best be understood by reference to the following specification taken in connection with the accompanying drawings, in which:

Fig. 4 is an enlarged sectional view illustrating the structural arrangement of certain of the component parts of the device;

Fig. 5 is a sectional view taken along the lines 5—5 in Fig. 3;

Fig. 6 is a sectional view taken along the lines 6—6 in Fig. 3;

Fig. 7 is a detailed view, partially in section, illustrating the circuit closing and opening contact assembly embodied in the device;

Figure 9:
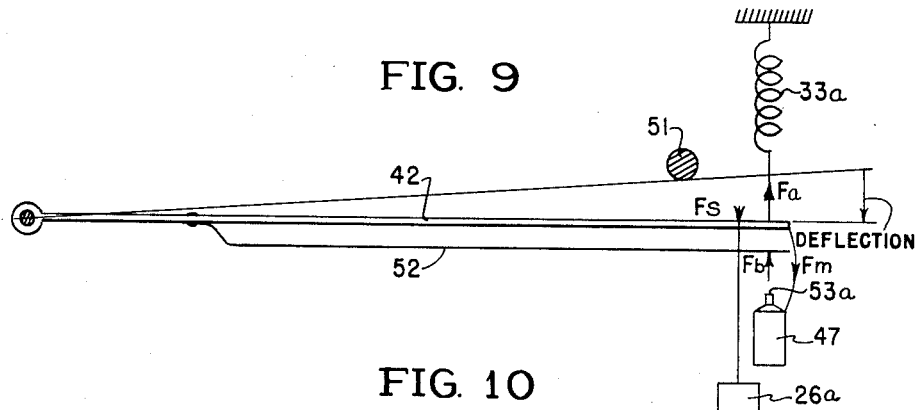
Figure 10:
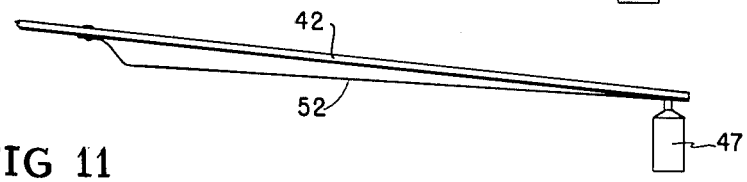
Figure 11:
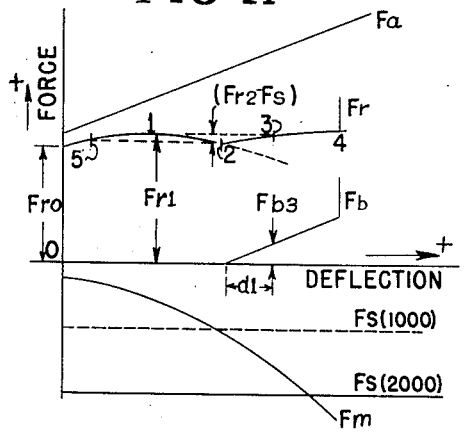
Figure 12:
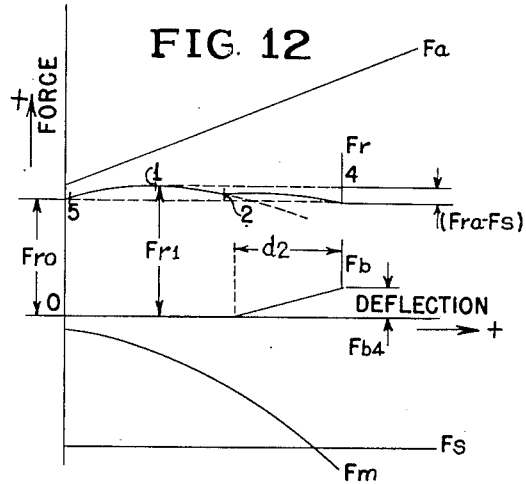
Figure 13:
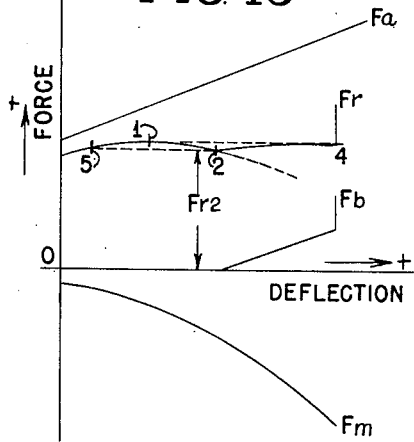

Fig. 8 diagrammatically illustrates the speed indicating circuit;

Fig. 9 schematically illustrates the equivalent mechanical system of the circuit closing and opening assembly;

Fig. 10 illustrates the system shown in Fig. 9, with certain parts thereof in changed position; and Figs. 11, 12 and 13 are graphs illustrating the mode of operation of the mechanical system making up the circuit control assembly.

Figure 1:
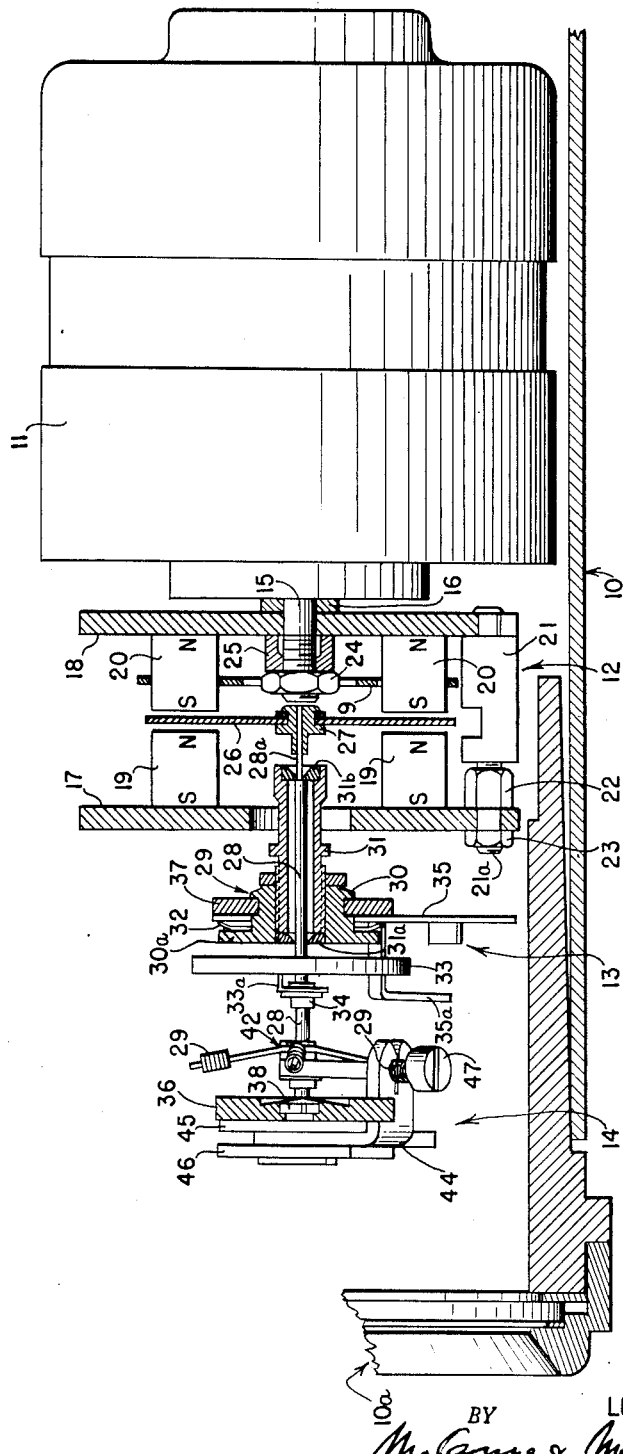
Fig. 1 is a fragmentary side sectional view of a speed indicating device having embodied therein speed indicating circuit control facilities characterized by the features of the present invention.

Referring now to the drawings and more particularly to Fig. 1 thereof, the present invention is there illustrated in its embodiment in a speed indicating device, i. e., a tachometer, which is adapted for aircraft use to indicate the speed of the turbosupercharger provided in the craft. All parts of the device are housed within a casing 10 having an end window assembly 10a which is supported substantially flush with the instrument panel of the craft. This device is provided with the usual scale and pointer assembly which is actuated through an electro-mechanical drive to provide an accurate reading of the turbosupercharger speed. Since this part of the instrument forms no part of the present invention, the details thereof have not been illustrated in the interest of simplifying the disclosure.

As indicated above, the purpose of the mechanism shown in Fig. 1 of the drawings, is to so control the speed indicating circuit shown in Fig. 8 of the drawings that an auxiliary indication is provided when the turbosupercharger speed of the craft equals or exceeds a predetermined value. In brief, this mechanism comprises a synchronous three-phase motor 11 which is adapted to control the indicating circuit control contact assembly 14 through speed translating means in the form of a magnetic drag disc assembly 12. Normally the contact assembly 14 is biased to its open circuit setting by means of an adjustable hair spring assembly 13. The motor 11 is arranged to be driven at a speed which is directly and synchronously related to the turbosupercharger speed which is to be measured. To this end, the shaft of the turbosupercharger is geared to a three-phase alternator, not shown, through a speed reducing gear train having a gear ratio such that the alternator is operated at a speed equal to $\frac{1}{20}$ of the turbosupercharger shaft speed, whereby the output frequency of the four-pole generator is equal to $\frac{1}{10}$ of the shaft speed of the turbosupercharger. The output current of this alternator is utilized directly to energize the stator windings of the motor 11. This motor is of the four-pole type, such that the speed thereof is exactly equal to $\frac{1}{20}$ the shaft speed of the turbosupercharger. The rotor shaft 15 of this motor directly supports the field structure of the magnetic drag disc assembly 12.

Briefly considered, this assembly comprises two ferro-magnetic discs 17 and 18 which are mounted in spaced apart relation axially of the shaft 15 by means of spacer bolts 21 rivet head connected to the disc 18 and spaced circumferentially around the outer edges of the two discs. The disc 18 is clamped to an end collar 16 rotatable with the shaft 15 by means of a nut 24 threaded on the end of this shaft and thrusting against the disc 18 through a thrust sleeve 25. To prevent relative rotation between the field structure of the drag disc assembly and the shaft 15, this shaft and the disc 18 are provided with flat engaging surfaces. The two discs 17 and 18 are utilized to support opposed permanent magnets 19 and 20 of the bar type, the magnets 19 being fixedly carried by the disc 17 and the opposed magnets 20 being fixedly mounted upon the disc 18. These magnets are so mounted that the opposed and spaced apart pole faces of each pair are of opposite magnetic polarity, so that flux traversal of the drag disc 26 interposed in the air gaps therebetween is assured. For the purpose of adjustably varying the lengths of these air gaps thereby to vary the torque developed in the drag disc 26 at a given speed of operation of the motor 11, the supporting disc 17 is adjustable toward and away from the spaced apart disc 18. To this end, each of the spacing bolts 21 is threaded along the end thereof which supports the disc 17 to receive adjusting nuts 22 and 23. Obviously by threading these nuts back and forth along the bolts 21, the air gaps between the opposed pole faced ends of the magnets 19 and 20 may be adjusted as desired. In order to compensate the magnetic drag disc assembly against changes in its operating characteristics with changing temperature, a compensating disc 9 is associated with the permanent magnets 20. This disc is formed of Carpenter "30" alloy steel having a permeability which changes in opposite sense with respect to temperature changes. It has the function of shunting a variable amount of flux from the air gaps as the temperature changes, thereby to render the operating characteristics of the drag disc assembly substantially independent of temperature changes.

Figure 3:
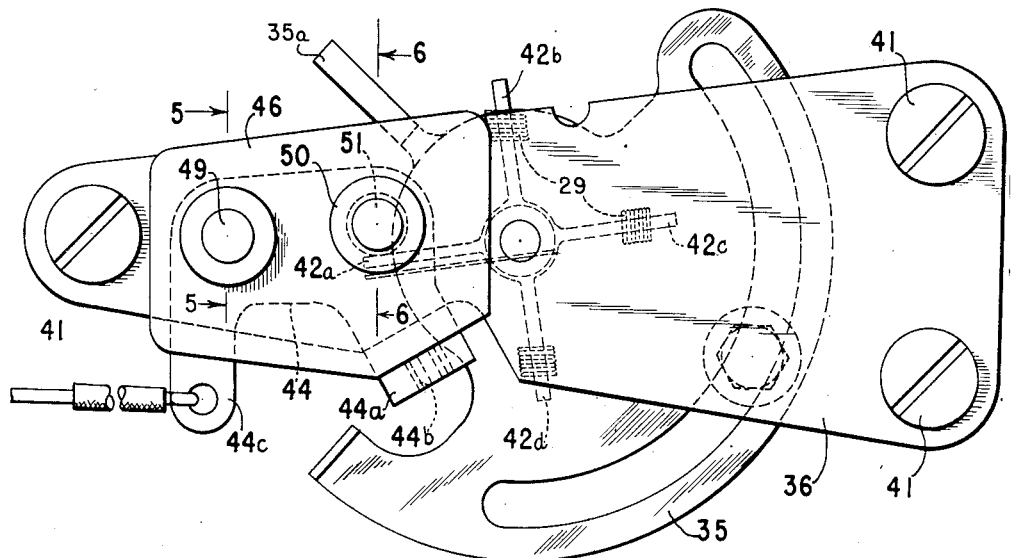
Fig. 3 is an end view of the sub-assembly shown in Fig. 2.
Figure 2:
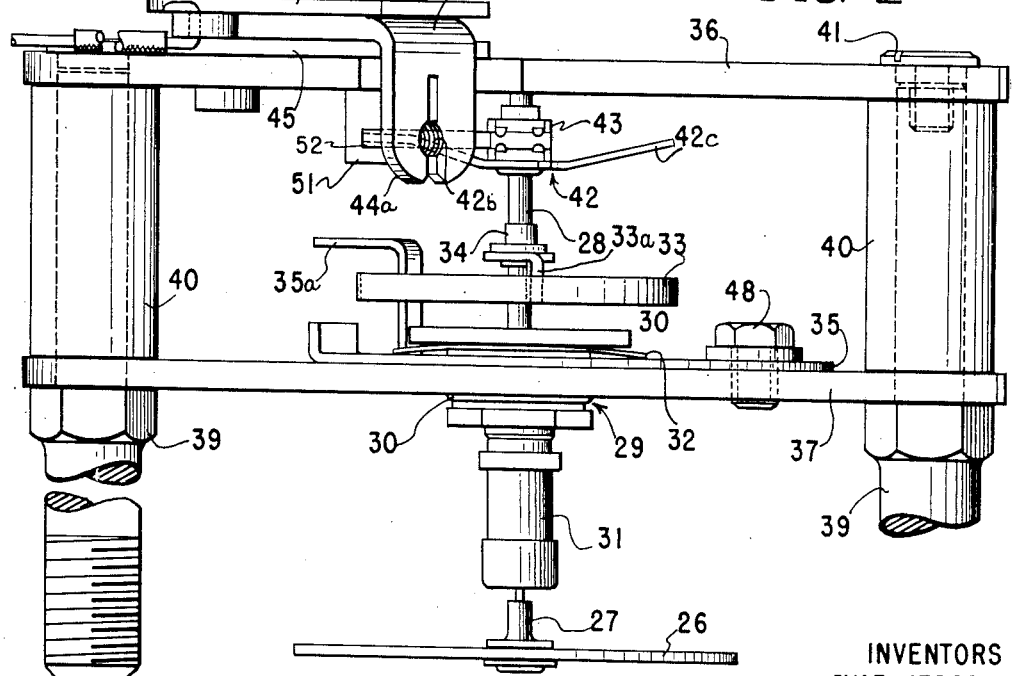
Fig. 2 is an underside view of one of the sub-assemblies embodied in the device shown in Fig. 1.

During operation of the motor 11 to drive the field structure of the magnetic drag disc assembly 12, this assembly functions to translate the motor speed into deflection of the disc supporting shaft 28 away from a pre-established normal setting. To this end, the drag disc 26 is fixedly mounted upon the end 28a of the shaft 28 by means of a supporting hub 27. As best shown in Figs. 2 and 3 of the drawings, the drag disc 26, the shaft 28 has the other parts of the contact and shaft biasing assemblies 14 and 13 are mounted upon a supporting frame which comprises two supporting members 36 and 37 carried by three supporting posts 39 mounted within the housing 10, and held in spaced apart relationship by means of spacing sleeves 40. Cap screws 41 threaded into the ends of the posts 39 to overlie the member 36 are used to maintain the named parts rigidly assembled. The shaft 28 is journaled in bearing supports mounted upon each of the two members 36 and 37. More specifically, the bearing assembly carried by the member 37 comprises a bushing 30, a bearing tube 31 and a jeweled disc bearing 31b which are fixedly interconnected with each other and with the member 37 in the manner illustrated. The bearing disc 31b rotatably supports the shaft 28 along the end 28a thereof of reduced diameter adjacent the step which connects this portion of the shaft with the enlarged portion thereof. The opposite end of the shaft 28 is journaled within the bearing surfaces of a jeweled bearing 38 which is fixedly mounted within an aperture formed in the supporting member 36 in alignment with the bearing tube 31.

For the purpose of normally biasing the shaft 28 to a predetermined angular setting, a coiled hair spring 33 is provided having its inner end fixedly anchored to a hub 34 mounted for rotation with the shaft 28 and its outer end anchored to an arm 35a of a tension adjusting member 35. The latter is rotatable about the bushing 30, and is normally pressed into engagement with the supporting member 37 by means of a dished washer 32 which embraces the bushing 30 and is stressed between the flange 30a of this bushing and the tension adjusting member. Normally the member 35 is held against rotation relative to the bushing 30 by means of a clamp screw 48 which is threaded into the supporting member 37. This screw extends through an arcuate slot cut in the member 35 and having a center common with the axis of rotation of the latter member. In order to increase or decrease the force exerted by the coil spring 33 to restrain the shaft 28 in its normal angular setting, it is only necessary to loosen the screw 48 and rotate the member 35 in one direction or the other about the bushing 30. After the desired spring tension is established, the adjusting member 35 may be tightened against the supporting member 37 to prevent further rotation of the adjusting member.

In order to balance the shaft 28 so that the force required to rotate the shaft through any increment of its angular range of deflection is entirely independent of the angular position of the device and hence of the shaft, a balancing spider 42 is fixedly mounted upon the shaft for rotation therewith by means of a hub 43. This spider is formed of soft magnetic steel and is provided with four legs 42a, 42b, 42c and 42d radiating from the center thereof and angularly spaced apart by 90 degrees. The three legs 42b, 42c and 42d each carry a small spring balance weight 29 adjustable longitudinally along the leg to change the balance of the shaft 28. Thus, by careful adjustment of these small weights along the legs upon which they are respectively mounted, the shaft 28 may be accurately balanced so that rotation of the shaft is entirely independent of the angular position thereof. In order to restrain the shaft 28 in the described predetermined angular setting, a stop head 51 forming a part of the assembly rivet 50 referred to below is interposed in the path of movement of the spider leg 42a in the direction of movement of the spider under the influence of the biasing spring 33.

Control of the speed indicating circuit is effected through the provision of a pair of contact elements 47 and 52 which are arranged to be operated into engagement in response to deflection of the shaft 28 through a predetermined angle away from its normal angular setting. Specifically, the stationary contact element 47 is comprised of a screw formed of a permanent magnet material and carrying a platinum tipped pin 53 in the end bore thereof. This screw is threaded into a threaded opening 44b in the overturned end 44a of a bracket piece 44. The bracket piece 44 is assembled upon the supporting member 36 by means of two rivets 49 and 50, and is insulated from this supporting member by means of inner and outer insulating plates 45 and 46 and insulating sleeves 54 and 56 which respectively embrace the rivets 49 and 50. It is provided with a terminal piece 44c to which one conductor of the signaling circuit may be soldered in the manner shown in Fig. 3 of the drawings. The movable contact element 52 is in the form of a non-magnetic, elongated platinum iridium alloy strip or ribbon, which is of low mass and has uniform cross sectional dimensions throughout its length. The inner end of this element is fixedly anchored to the hub 43 upon which the balancing spider 42 is mounted. Throughout its length this element is free and extends substantially parallel with the leg 42a of the spider 42. Not only does the movable contact element 52 possess the characteristics described above, but in addition is characterized by a very low spring constant and a natural frequency of vibration which is several times greater than the maximum vibratory impulse frequency which, during operation of the device, is transmitted through the housing 10 to the working parts of the device. By a low spring constant, it is meant that the element has a large ratio between deflection and the force producing the deflection, such that the application of a small force at the free end of the element results in a relatively large deflection of this end of the element. As will be apparent from a consideration of the circuit shown in Fig. 8 of the drawings, the described contact assembly is arranged directly to control the energization of a speed indicating lamp 58 from a current source 59.

In considering the operation of the device described above, it will be understood that when three-phase current is delivered to the field windings of the motor 11, the shaft 15 and the field structure of the drag disc assembly 21 are driven at a speed which is directly related to the frequency of the current supplied to the motor. The field structure of the drag disc assembly 21, in rotating about the metal drag disc 26, develops torque in this disc by virtue of the flux traversal of the disc produced by the permanent magnets 19 and 20 and as a consequence of their motion relative to the disc 26. This torque is, of course, related to the speed of rotation of the field structure and is opposed by the spring bias acting between the shaft 28 and the supporting member 37. However, by appropriate adjustment of the spring tension in the biasing spring 33, and an appropriate adjustment of the spacing between the pole face ends of the magnets 19 and 20, the torque developed in the disc 26 may be made to produce a predetermined angular deflection of the shaft 28 away from its normal angular setting in response to a predetermined speed of operation of the motor 11 and the field structure driven thereby. Thus by making appropriate adjustments of the character described and by suitably adjusting the setting of the stationary contact screw 47, the shaft 28 may be deflected through an angle sufficient to bring the free end of the soft steel spider arm 42a within the field of accelerating or snap-acting influence of the magnetized screw 47 when the motor 11 is operated at a speed indicating a measured turbo-supercharger speed of 22,000 revolutions per minute, for example. Immediately the free end of the spider arm 42a is thus moved sufficiently close to the magnetized contact screw 47, it is snapped toward the contact end of the pin 53 under the influence of accelerating force due to the magnetized screw. In so doing, it rotates the shaft 28 slightly, thereby to snap the free end of the contact element 52 into engagement with the contact end of the pin 53. Thus, closure of the circuit for energizing the signal lamp 58 is effected with a snap action.

After the contact elements 52 and 47 are thus engaged to complete the circuit for energizing the lamp 58, they are held in engagement until the speed of operation of the motor 11 is reduced below a predetermined lower value. Thus when the speed of operation of the motor 11 decreases a given amount from the predetermined speed at which the contact points 52a and 53a are engaged to energize the lamp 58, disengagement of these contact points is produced to effect deenergization of the lamp 58. Since the free end of the spider arm 42a is attracted toward the contact point 53a, separation of the contact point 52a from the contact point 53a obviously cannot occur at the same speed as that at which engagement of these contact points is produced. However, the speed differential between the cut-in and cut-out points of contact point engagement and disengagement must be as small as possible in order to avoid the necessity of an excessive drop in speed to cause a subsequent deenergization of the signal lamp. This factor of the speed difference between the contact cut-in and cut-out points definitely determines the net permissible attractive force which the magnetized screw 47 may exert upon the spider arm 42a. Thus if this force is too great the speed difference between the contact cut-in and contact cut-out points becomes excessive. On the other hand, the tendency of the contacts to chatter under the influence of the vibration forces transmitted to the working parts of the instrument definitely increases as the attractive force exerted upon the spider arm 42a by the magnetized screw 47 is decreased. The problem, therefore, is to provide a contact element 52 having physical characteristics such that the contact point 52a thereof will remain in contact with the contact point 53a regardless of the frequency and amplitude of the vibratory forces acting upon the instrument and while employing a very small net magnetic holding force between the screw 47 and the spider arm 42a. The phrase "net magnetic holding force" is used herein to denote the effective holding force between the screw 47 and the spider arm 42a as contrasted with the magnetic pull component of this force, since actually, in the described construction the effective force is equal to the force exerted by the magnet screw 47 minus the counteracting force caused by flexure of the spring member 52. Thus, it is only necessary to drop the turbosupercharger speed sufficiently to overcome the net holding force acting on the spring member 52 in order to obtain disengagement of the contacts 52a and 53a. Actually, it is theoretically and practically possible to obtain a contact pressure between the two contacts at the point of contact cut-in which may be many times greater than the force acting at the same radius and corresponding to a difference in torque represented by the difference between the contact cut-in and contact cut-out speeds.

In the analysis of this problem it is pointed out first that the vibration forces acting upon the parts of the instrument produce no appreciable rotational vibration of the spider 42, but do produce substantial vibration of the screw 43 longitudinally thereof toward and away from the free ends of the contact element 52 and the arm 42a. In this regard it is noted that the shaft and hair spring assembly, while having a very low characteristic spring constant, also has a very low natural frequency of oscillation. The latter characteristic prevents the assembly from following the vibratory forces acting thereon since these forces are of substantially higher frequency. Thus, the contact point 53a may be regarded as being moved toward and away from the end of the arm 42a which is fixed in space, at a rate and by an amount which is related to the frequency and amplitude of the vibratory driving forces. To prevent chattering of the engaged contact points 53a and 52a, the contact point 52a must follow this movement of the contact point 53a. Such following movement of the contact point 53a is obtained by flexure of the deformed resilient contact element 52. Thus incident to movement of the contact point 52a into engagement with the contact point 53a, the contact element 52 is deformed so that the free end thereof engages the arm 42a. Accordingly, when the contact point 53a moves away from the arm 42a, the contact element 52 relieves itself of stress and causes the contact point 52a to follow the contact point 53a in engagement therewith. The importance of the spacing between the arm 42a and the contact element 52 at the free ends thereof and with the latter element unflexed now becomes evident. Thus if the amplitude of vibration of the screw 47 relative to the element 52 exceeds this spacing, the contact point 53a will leave the contact point 52a to open the indicating circuit as the contact point 53a moves away from the arm 42a through a position wherein the contact element 52 is unflexed. For this reason the spacing between the free end of the arm 42a and the free end of the contact element 52 should at least equal, and preferably exceed, the maximum amplitude of vibration of the screw 47 relative to the arm 42a which may be encountered in the use of the instrument.

In order that the contact point 52a may follow the contact point 53a, and more specifically that flickerless operation of the signal lamp may be obtained under forced vibration of the fixed contact, it is necessary that the change in contact pressure per unit displacement due to the vibration be held to a low value. To this end, the contact element 52 must have a low spring constant. This means that the element 52 should have a small bending moment of inertia, especially at its fixed end. The contact element 52 must also have a high natural frequency of oscillation, preferably several times higher than the highest vibratory frequency likely to be encountered, since otherwise the contact point 52a thereof will not follow the vibrating contact point 53a. This means that the contact element should be of minimum mass especially at its free end and possess a high bending moment of inertia, especially at its fixed end. The latter requirement is inconsistent with the prior requirement that the element have a low spring constant.

To compromise this inconsistency it is preferable to use a contact element 52 of strip form having uniform cross sectional dimensions throughout its length and thus keep the mass at the free end of the element as low as possible consistent with other requirements, such as providing sufficient material to offset loss due to arcing, etc. The latter is minimized by using a platinum iridium alloy as the material from which the element is made, and by so poling the direct current source 59 that metal transfer due to arcing at the contact points is from the pin 53 to the contact element 52. With the contact element 52 fixedly anchored at one end, it is essentially a cantilever strip. Accordingly, the deflection $d$ in inches which is produced when a force F in pounds is applied thereto at the free end thereof is defined by the expression:

$$d = \frac{4FL^3}{Ebh^3}$$

where:

$b$ = width of strip in inches
$h$ = thickness of strip in inches
$L$ = length of the free part of the contact element in inches
$E$ = elastic modulus of the contact element in pounds per square inch
$I$ = bending moment of inertia of the contact element in inches$^4$.

The fundamental frequency of the contact element may be expressed thus:

$$f(\text{cycles/second}) = 3.18 \frac{h}{L^2} \sqrt{\frac{E}{W}}$$

where:

$h$, L and E are as defined above, and
$W$ = density of the material from which the contact element is made in pounds per cubic inch.

To meet the requirement that the spring constant of the contact element be as low as possible;

$$Fd = \frac{Ebh^3}{4L^3}$$

must be as small as possible.

Specifically the factor $bh^3$ must be smaller than the factor $$\frac{4FL^3}{ED}$$

in order that the contact element 52 may have the desired spring constant. Now, for any given application or use of the instrument, the maximum value of $d$ may be considered as being equal to the maximum amplitude of the impressed vibration. Also, the value of E is fixed, being determined only by the composition of the material from which the element 52 is made. In the illustrated construction, however, the value of F may be several times greater than that force which is calculated to be equivalent to the difference in torque between the cut-in and cut-out speeds. Even in the absence of vibration, this large value of F provides a highly desirable operating characteristic for the device. To meet the requirement that the natural frequency of the contact element be as high as possible;

$$f = \frac{3.18h}{L^2}\sqrt{\frac{E}{W}}$$

must be large. In order to satisfy both requirements concurrently, the ratio $f/F/d$ must be large. Thus:

$$\frac{\frac{3.18h}{L^2}\sqrt{\frac{E}{W}}}{\frac{Ebh^3}{4L^3}}$$

or $$\frac{12.7L}{bh^2}\sqrt{\frac{1}{EW}}$$

must be as large as possible. Now for any given material from which the contact element 52 is made, the factor $$12.7\sqrt{\frac{1}{EW}}$$

is constant. Accordingly, to meet both of the above requirements concurrently, the variable $$\frac{L}{bh^2}$$

should be as large as possible. To summarize, the variables L, $b$ and $h$ should be selected to give the largest possible factor of $$\frac{L}{bh^2}$$

However, the optimum value for L is usually also subject to other important considerations, such as contact pressure, space, etc., so that usually only $b$ and $h$ provide sufficient range for variation, and since $h$ enters as the second power, it is obviously desirable to keep the thickness of the contact element at as low a value as possible.

The effect of the spring constant of the contact element 52 on the operation of the device, under both the condition of no extraneous vibration of the instrument and the condition of a vibratory force acting upon the contact screw 47 through the instrument housing, will best be understood by reference to Figs. 9 through 13 of the drawings. Insofar as the forces acting upon the parts 42 and 52 are concerned, the mechanical system shown in Fig. 9 of the drawings is the exact equivalent of the mechanical structure shown in Figs. 7 and 8 of the drawings. In Fig. 9, however, the ferro-magnetic spider arm 42 is shown as being freely pivoted by means of a frictionless bearing at its left end.

In brief, the forces acting on the member 42 which determine the position of this member relative to the contact screw 47 fall into two classes, i. e., those forces tending to pull the end of the arm 42 upward away from the contact screw 47, which forces are considered as positive, for purposes of analysis, and those forces tending to pull the end of the arm 42 toward the contact screw 47 which latter forces are considered as negative for purposes of analysis. Further, the point of zero deflection of the arm 42 may be regarded as that point at which this arm engages the stop 51.

On the basis of the above assumption, and considering clockwise rotation of the arm 42 away from the stop 51 as positive deflection, the changes in the component forces acting upon this arm may be represented by the curves shown in Fig. 11 of the drawings. As there shown, the force $F_a$ is the positive force produced by the restraining action of the hair spring 33, which is represented by the equivalent spring 33a in Fig. 9. From an inspection of the $F_a$ force-deflection curve, it will be noted that as the element 42 leaves the stop 51, the force $F_a$ increases linearly with movement of the arm 42 away from the stop 51. The force $F_b$ is that force produced by engagement of the contact point 53a with the contact point 52a at the free end of the flexible element 52. This force obviously has a zero value when the arm 42 is against the stop 51 and does not depart from zero as the arm 42 is deflected positively away from the stop 51 until the contact 52a makes contact with the contact point 53a. From this point on, the force $F_b$ increases linearly in a positive sense with continued positive deflection of the arm 42a until the free end of the contact element 52 is flexed to engage the free end of the arm 42. Further positive deflection of the arm 42 is accompanied by a sudden increase in the force $F_b$, assuming that the contact screw 47 is rigidly anchored against movement. Thus, the variation in the positive forces $F_a$ and $F_b$ acting upon the arm 42 during positive deflection of this arm are indicated by the curves $F_a$ and $F_b$.

The attractive force acting upon the arm 42 by the magnet 47 is represented by the curve $F_m$ and is negative in the sense that it acts in opposition to the forces $F_a$ and $F_b$. This attractive force does not vary linearly with positive deflection of the arm 46, but on the contrary exhibits an increasing rate of change as the arm 42 approaches the magnet 47. Also, its slope or first derivative has a negative value as compared with the positive slope values of the elastic members 52 and 42. Since the slope of the force-deflection curve of an elastic member is defined as being equal to the spring constant of the member, it is proper to consider the mechanical system comprising the magnet 47 and the ferro-magnetic arm 42 as being equivalent to a mechanical member possessing a negative spring constant, such, for example, as a buckled or snap-acting spring possessing the force-deflection characteristic represented by the $F_m$ curve. It is of importance to use a magnet element 47 which has a minimum curvature in its force-deflection characteristic, such, for example, as a bar magnet, as contrasted with a conventional U-shaped magnet which has a large curvature in its force-deflection characteristic. As will be apparent from the following explanation, by decreasing the curvature of this characteristic and properly relating this characteristic to the force-deflection characteristics of the spring 33 and contact element 52, a high ratio of contact pressure between the contact points to the differential between cut-in and cut-off speeds is obtained.

In addition to the forces just considered, there is a further negative force $F_s$ acting upon the arm 42, this latter force being produced by the torque exerted by the drag disc 26 as a consequence of rotation of the drag disc magnets 19 and 20. Since the magnitude of this force is independent of the position of the arm 42 and is a function solely of the rotor speed of the drag disc assembly, it has been equivalently represented in Fig. 9 as a weight 26a acting to pull the arm 42 toward the contact screw 47. The magnitude of the force $F_m$ is, of course, proportional to the rotor speed of the drag disc assembly. Thus, it may be represented as a constant value $F_s$ (1000) for a rotor speed of 1000 R. P. M. and as a contant value $F_m$ (2000) at a rotor speed of 2000 R. P. M., etc., Combining the forces $F_a$, $F_b$ and $F_m$ acting on the arm 42 under a condition of zero rotor speed, i. e. under a condition when $F_s=0$, the net or resultant force acting upon the arm 42 during positive deflection of this arm is represented by the curve $F_r$. Thus, the curve $F_r$ indicates the force with which the arm 42 will react against any effort to deflect it at each point along its deflection axis. Now, as the rotor speed of the drag disc assembly increases, a negative force $F_s$ is developed in opposition to the force $F_r$. At the instant when the force $F_s$ becomes equal to the zero deflection resultant force $F_{ro}$, the arm 42 begins to leave the stop 51, and a further slight increase in the force $F_s$ occasioned by a further increase in the rotor speed results in slow positive deflection of the arm 42 until it is moved to a position corresponding to the point 1 along the deflection axis. Between the deflection points 1 and 2 along the deflection axis, the resultant force $F_r$ exhibits a negative slope representing a negative spring constant. Consequently, when the rotor speed becomes such that the force $F_s$ exactly equals the force $F_{r1}$, the arm 42 will move with a snap action to the deflection point 2 even though no further increase in rotor speed occurs. When the arm 42 is deflected to a position corresponding to the point 2 along the deflection axis, the contact point 52a engages the contact point 53a, but at this instant an excess of force equal to $F_{r2}-F_s$ is acting upon the arm 42, assuming that the force $F_s$ has not changed. Hence, deflection of the arm 42 will continue until it reaches a position corresponding to the point 3 along the deflection axis, at which point $F_r$ exactly equals $F_s$. Thus, in the particular case considered, wherein the rotor speed is held exactly at the cut-in value, the arm 42 is deflected only to a position corresponding to the point 3 along the deflection axis, which means that a clearance will remain between the free end of the contact element 52 and the free end of the arm 42. Obviously, if the rotor speed is subsequently increased above the cut-in value, the arm 42 will be further positively deflected until the point 4 is reached along the deflection axis. This point represents the limit of deflection at which the free end of the arm 42 engages the free end of the contact element 52 in the manner shown in Fig. 10 of the drawings.

Considering now negative deflection of the arm 42 as effected through a slow decrease in the rotor speed from the cut-in value, the arm 42 will slowly approach the stop 51 during negative deflection thereof from a position corresponding to the point 3 to a position corresponding to the point 2 along the deflection axis. When the arm 42 is negatively deflected back to the point 2, the contact point 52a will just leave the contact point 53a and, because of the negative slope of the curve $F_r$ in the region from the point 2 to the point 1 along the deflection axis, the arm 42 will then move with a snap action toward the stop 51. Assuming that during such reverse movement of the arm 42, the rotor speed remains unchanged to hold the force $F_s$ constant, an excess of positive force acts upon the arm 42 when it reaches a position corresponding to the point 1, so that this arm continues its negative deflection until it reaches a position corresponding to the point 5 along the deflection axis, at which point the force $F_r$ equals exactly the force $F_s$. Any further reduction in the force $F_s$ produced through a further increase in the rotor speed will result in a slow, unaccelerated negative deflection of the arm from a position corresponding to the point 5 along the deflection axis to a position wherein it re-engages the stop 51.

From the above explanation, it will be apparent that the contact pressure produced between the contact of points 52a and 53a at the point of contact cut-in is equal to the value of $F_b$ at the point 3 along the deflection axis, and thus is proportional to the distance $F_{b3}$. The operating differential force, i. e., the torque difference between the torques developed between the cut-in and cut-off speeds is represented by the distance $F_{r2}-F_s$. It will be seen, therefore, that if the component parts of the device are designed to provide force curves $F_a$, $F_b$ and $F_m$ of proper slope it is possible to obtain a contact pressure between the contact points 52a and 53a at the cut-in speed which is considerably in excess of the pressure equivalent of the torque difference between the cut-in and cut-off speeds.

Under a condition of forced vibration of the contact screw 47 at the contact cut-in speed, the contact pressure $F_b$ between the contact points will vary about the mean value $F_{b3}$ and between zero and twice $F_{b3}$ or more, assuming that during such vibration the arm 42 remains stationary and the amplitude of vibration of the contact screw 47 equals the deflection distance between the points 3 and 2 along the deflection axis, and further that the natural frequency of vibration of the contact element 52 is infinitely high, i. e., that the inertia effect of this element is negligible at the particular frequency of vibration of the screw 47.

In the case just considered, a contact pressure $F_{b3}$ is produced by the contact points at the cut-in speed and if the rotor speed is slowly reduced below this value to produce a corresponding negative deflection of the arm 42, the contact pressure will be correspondingly slowly reduced to a zero value when the arm is negatively deflected to the point 2 along the deflection axis. Consequently, if the instrument, and more particularly the contact screw 47, is vibrated while engagement of the contacts 52a and 53a is maintained at some speed value below the cut-in speed and just above the cut-off speed, the tendency of the contacts to chatter is materially increased as compared with the tendency for contact chattering which prevails at the cut-in speed. In most installations, this increasing tendency of the contacts to chatter as the rotor speed is reduced toward the cut-off value is not objectionable, but if improvement is desired in this regard, it is possible to reduce the positive spring constant opposing the magnetic pull on the arm 42, for the purpose of obtaining continuous snap action in the entire deflection range from the point 1 to the point 4 along the deflection axis for both increasing and decreasing speeds. In such case, the various force-deflection factors analyzed above will have the characteristics shown in Fig. 12 of the drawings. As there illustrated, the force characteristic of the force factor $F_b$ is altered, by appropriate design of the contact element 52, to so change the resultant force curve $F_r$ that it is characterized by a negative slope in the region from the point 2 to the point 4 along the deflection axis as well as over the region between the points 1 and 2 of this axis.

When the spring constant of the contact element 52 is so reduced by appropriate design of this element that the characteristic $F_r$ as shown in Fig. 12 is obtained, the spider arm 42 will slowly be deflected away from the stop 51 as the rotor speed is slowly increased from zero until it is deflected to a position corresponding to the point 1 along the deflection axis. At this point, the force $F_s$ becomes exactly equal to the force $F_{r1}$. Assuming, therefore, that the rotor speed is held constant when this arm position is reached, the arm 42 will be deflected with a snap action all the way to a position corresponding to the point 4 along the deflection axis. This extended deflection of the arm 42 results from the fact that the resultant force characteristic $F_r$ has a negative slope throughout the entire region between the points 1 and 4 thereof. Just prior to reaching the point 4, an excess of force equal to $F_{r4}-F_s$ acts on the free end of the arm 42, and thus the free end of the contact element 52 will be pressed against the free end of the arm 42 with a force of this value at the end of the arm travel.

As the rotor speed is subsequently slowly reduced, the force differential $F_{r4}-F_s$ will be correspondingly slowly reduced until it reaches a zero value, i. e. $F_{r4}=F_s$. At this instant the arm 42 will be negatively deflected with a snap action all the way to a position corresponding to the point 5 along the deflection axis. Thus, the entire region between points 1 and 4 along the curve $F_r$ represents a condition of instability during both increasing and decreasing rotor speeds. The contact pressure $F_b$ can therefore possess stable values of either zero or $F_{b4}$, and will possess intermediate values only under transient conditions during actual cut-in or cut-off operations or under forced vibration of the contact screw 47 at such a frequency that the arm 42 may be assumed to remain stationary. Actually with a system embodying the Fig. 12 characteristics, the static contact pressure between the contacts 52a and 53a remains at a minimum value of $F_{b4}$ not only at the point of cut-in speed, but also at reduced speeds approaching the cut-off speed, except at the exact instant when the cut-off movement of the arm 42 starts. As in the first case considered, this contact pressure may have a value several times greater than that force which is equivalent to the difference between the torque occurring at the cut-in speed and that occurring at the cut-off speed. Also, under a condition of forced vibration of the contact screw 47 at a frequency such that the arm 42 may be regarded as remaining stationary, the vibration amplitude of the screw must equal that represented by the deflection distance between the points 4 and 2 along the curve $F_r$ ($d_2$) before the contact pressure between the contacts 52a and 53a will drop to zero. This distance when contrasted with the distance $d_1$ obtained with a contact element 52 of greater spring constant, as shown in Fig. 11, emphasizes the importance of the low spring constant of this element in reducing the tendency of the contact points 52a and 53a to chatter under a condition of forced vibration of the screw 47. Also, the above statement is predicated on the further assumption that the contact element possesses an infinite high natural frequency, i. e., that its inertia effects are so small as to permit the contact element 52 instantly to follow motion of the contact screw 47 within the range of deflection of the element 52 which is produced.

A further case intermediate the two cases considered above and obtained by designing the contact element 52 to have a force-deflection characteristic curve $F_b$ of a slope less than that of the $F_b$ curve shown in Fig. 11 and greater than that of the $F_b$ curve shown in Fig. 12, is illustrated in Fig. 13 of the drawings. As there shown, the contact element 52 is designed to have a spring constant such that the net force characteristic curve $F_r$ is characterized by a negative spring constant in the deflection region between the points 1 and 2 and a very small positive spring constant in the deflection region between the points 2 and 4. In this case, as the rotor speed is slowly increased to the cut-in value, the arm 42 will be slowly deflected away from the stop 51 until it reaches a position corresponding to the point 1 along the deflection axis, at which time it will be deflected with a snap action to a position corresponding to the point 4 along the deflection axis. However, upon a subsequent slow reduction in the rotor speed from the cut-in value toward the cut-off value, the arm 42 will be slowly deflected negatively from a position corresponding to the point 4 along the deflection axis to a position corresponding to the point 2 therealong as a result of the positive slope of the $F_r$ curve in the region between these two points. Thus, under the condition of decreasing rotor speed, the stable static contact pressure will be less than that which obtains at the point 4, corresponding to the cut-in speed. When the speed is reduced sufficiently to equalize the forces $F_s$ and $F_{r2}$, at which point the contact pressure becomes zero, the arm 42 will be negatively deflected with a snap action until it reaches a position corresponding to the point 5 along the deflection axis, from which point it will be slowly deflected negatively to its normal position during a further decrease in the rotor speed.

From the above explanation it will be apparent that the point 1 along each of the force-deflection curves of Figs. 12 and 13 represents the maximum force point along each curve, and that the contact element 52 starts to act at a point beyond this point along the deflection axis, i. e. at the point 2 therealong. By designing the contact element 52 to have a spring constant of sufficiently low value that no portion of the overall force-deflection curve $F_r$ has a force value greater than that at the point 1 therealong, continuous accelerated deflection of the arm 42 from the point 1 to the end of the deflection range is obtained. Moreover, such design of the contact element permits following movement of the contact element 52 throughout the full portion $d_2$ of the deflection range under a condition of forced vibration of the contact screw 47 even though the rotor speed is held exactly at the cut-in value.

In considering the above three cases, the effect of friction between the moving parts of the system and contact welding at the contacts 52a and 53a has been disregarded. Since, however, the co-efficient of static friction is invariably greater than the co-efficient of kinetic friction, snap motion is even more likely to occur when the friction factors are considered. Obviously, for consistency and accuracy of operation, friction must be held to a minimum. Contact sticking occasioned by welding at the contact points 52a and 53a will also increase the tendency of the contact points to operate with a snap action. If, however, the force representative of the welding factor is maintained at a value less than the force $F_{r4}-F_s$, represented in Fig. 12, it will be without effect in determining the cut-off speed.

From the foregoing analysis, it will be clear that the most desirable value of spring constant for the contact element 52 is unavoidably linked with the characteristics of the permanent magnet screw 47 and the hair spring 33. On the basis of experimental knowledge obtained relative to the apparent negative spring constant obtainable with permanent magnet combinations of reasonable size and shape, and considered in combination with the known spring characteristic of the spring 33, it has been found that the elastic contact element 52 should possess a very low spring constant for most desirable operation under the stated use conditions. Obviously under circumstances where a large magnet may be used, and in order to obtain the maximum possible ratio of contact pressure to operating differential, the optimum value of spring constant for the contact element 52 may be somewhat higher than the lowest value practically obtainable.

As stated above, to assure satisfactory operation of the device under a condition of high frequency forced vibration of the instrument, the contact element 52 must also have a relatively high fundamental resonant or natural frequency of vibration. It has also been indicated that if the element 52 is in the form of a cantilever strip of uniform cross sectional area, the strip must have a distribution of material such that when the linear dimensions defining the width $b$, the thickness $h$ and the free length $L$ of the strip are arranged as a factor $$\frac{L}{bh^2}$$

then this factor should have as large a value as other requirements will permit in order that the strip may concurrently possess the highest possible resonant frequency and the lowest possible spring constant.

In an aircraft installation, vibration of the screw 47 is predominantly due to operation of the craft engine and has a fundamental impulse frequency equalling the engine speed. Usually this fundamental frequency does not exceed a value of 4,000 cycles per minute. Harmonics of this fundamental frequency usually are of low amplitude and have no appreciable effect in driving the screw 47.

It has been found that a strip contact element 52 of uniform cross section having the following physical specifications is satisfactory in an installation of the character mentioned:

| | |
|---|---|
| Material | 10% iridium platinum alloy |
| Length | .250 inches |
| Width | .020 inches |
| Thickness | .002 inches |

A contact element of these specifications has a natural resonant frequency of 34,000 cycles per minute which is approximately eight and a half times greater than the highest fundamental vibration frequency likely to be encountered. Higher harmonics may be present, but those harmonics which approach the resonant frequency of the contact element, i. e. the eighth or ninth, are of no appreciable amplitude. A contact element having the described charactersitics also has a very low spring constant. Further, if the attractive force of the contact screw 47 is selected to produce a net pull on the arm 42 of from .10 to .15 gram at the exact point of contact engagement and at cut-in speed, and a contact element 52 having the physical characteristics described above is employed, the difference between the cut-in speed at which the contacts are engaged and the cut-out speed at which they are disengaged is less than five percent of the operating speed range within which speed measurement is to be obtained. As previously explained, the actual contact pressure existing at the cut-in speed will be several times greater than the value of .10 to .15 gram given above. This arrangement has been found to produce flickerless operation of the indicating lamp 58 over the entire speed range within which it is energized, even though the instrument is subjected to excessive vibration.

While there has been described what is at present considered to be the preferred embodiment of the invention, it will be understood that various modifications may be made therein which are within the true spirit and scope of the invention as defined in the appended claims.

We claim:

1. In a speed indicating device which is adapted to be subjected to sustained vibration and includes a rotatable element adapted to be driven at a speed directly related to the speed to be indicated; the means for controlling a speed responsive circuit which comprises a shaft, a multi-legged balancing spider carried by said shaft for rotation therewith and provided with a hub anchored to said shaft, said spider having a magnetic leg, spring means biasing said shaft for rotation in one direction, stop means normally engaged by one leg of said spider to hold said shaft in a normal angular setting, means driven by said rotatable element for translating the speed of said rotatable element into a related angular deflection of said shaft away from said normal setting, an elongated contact element radiating from the hub of said spider for angular deflection therewith, a contact disposed in the path of movement of the free end of said contact element, and permanent magnet means coacting with said magnetic leg of said spider to produce engagement of said contact element with said contact in response to a predetermined angular deflection of said shaft away from said normal setting.

2. In a speed indicating device which is adapted to be subjected to sustained vibration and includes a rotatable element adapted to be driven at a speed directly related to the speed to be indicated; the means for controlling a speed responsive circuit which comprises a shaft, a multi-legged balancing spider carried by said shaft for rotation therewith, said spider having a magnetic leg, means driven by said rotatable element for translating the speed of said rotatable element into a related angular deflection of said shaft away from a normal setting, an elongated contact element radiating from said shaft in parallel spaced relation with the magnetic leg of said spider, a contact disposed in the path of movement of the free end of said contact element and adapted to follow the vibration to which the device is subjected, and permanent magnet means coacting with said magnetic leg of said spider to produce engagement of said contact element with said contact in response to a predetermined angular deflection of said shaft away from its normal setting, the spacing between the free end of said contact element and the magnetic leg of said spider being at least equal to the maximum amplitude of vibration of said contact.

3. In a circuit control device which includes a pair of contact points, the means for actuating said contact points into and out of engagement which comprises a control member adapted to be deflected through a predetermined deflection range, spring means for applying a positive force to said member which resists deflection of said member in one direction, the positive force applied to said member by said spring means increasing linearly with increasing deflection of said member in said one direction, magnet means for applying a negative force to said member which assists deflection of said member in said one direction, the negative force applied to said member by said magnet means increasing exponentially with increasing deflection of said member in said one direction, said two last-named means being proportioned to produce a positive force-deflection characteristic for said member which has a maximum force peak at a predetermined point along said deflection range, whereby a snap action deflection of said member to said end of said range is produced in response to the application of said maximum force to said member, and additional spring means for applying an additional positive force to said member resisting deflection of said member after a predetermined deflection thereof beyond said maximum force peak, the additional positive force applied to said member by said additional spring means increasing linearly with increasing deflection of said member in said one direction beyond said maximum force peak and said additional spring means having a spring constant of such low value that no portion of the resultant force-deflection characteristic has a force value exceeding said maximum force value, whereby said additional positive force is prevented from interfering with the snap action deflection of said member to the end of said range.

4. In a speed indicating device which is adapted to be subjected to sustained vibration and includes a rotatable element adapted to be driven at a speed directly related to the speed to be indicated; the means for controlling an electrical circuit which comprises a shaft, a magnetic leg radiating from said shaft, balancing means carried by said shaft for counterbalancing said leg, spring means biasing said shaft to a normal angular setting, means driven by said rotatable element for translating the speed of said element into a related angular deflection of said shaft away from said normal setting, an elongated contact element mounted upon said shaft to radiate therefrom in substantially parallel relation with said magnetic leg and angularly deflectable with said shaft, a contact disposed in the path of movement of the free end of said contact element and adapted to follow the vibration to which the device is subjected, and magnet means coacting with said magnetic leg to produce engagement of said contact element with said contact in response to a predetermined angular deflection of said shaft away from its normal setting, the spacing between the free end of said contact element and the magnetic leg of said spider being at least equal to the maximum amplitude of vibration of said contact.

5. In a circuit control device which includes a pair of contact points, the means for actuating said contact points into and out of engagement which comprises a control member adapted to be deflected through a predetermined deflection range, spring means for applying a positive force to said member which resists deflection of said member in one direction, the positive force applied to said member by said spring means increasing linearly with increasing deflection of said member in said one direction, negative force producing means for applying a negative force to said member which assists deflection of said member in said one direction, the negative force applied to said member by said negative force producing means increasing exponentially with increasing deflection of said member in said one direction, and the positive force applied to said member by said spring means being greater than the negative force applied to said member by said negative force producing means throughout said deflection range and the relative magnitudes of said forces being such that a positive force-deflection characteristic is produced for said member which has a maximum force peak at a predetermined point along said deflection range, whereby a snap action deflection of said member to the end of said range is produced in response to the application of said maximum force to said member, and additional spring means for applying an additional positive force to said member resisting deflection of said member after a predetermined deflection thereof beyond said maximum force peak, the additional positive force applied to said member by said additional spring means increasing linearly with increasing deflection of said member in said one direction beyond said maximum force peak and said additional spring means having a spring constant of such low value that no portion of the resultant force-deflection characteristic has a positive force value exceeding said maximum force peak, whereby said additional positive force is prevented from interfering with the snap action deflection of said member to the end of said range.

6. In a circuit control device which includes a pair of contact points, the means for actuating said contact points into and out of engagement which comprises a control member adapted to be deflected through a predetermined deflection range, spring means for applying a positive force to said member which resists deflection of said member in one direction, the positive force applied to said member by said spring means increasing linearly with increasing deflection of said member in said one direction, magnet means for applying a negative force to said member which assists deflection of said member in said one direction, the negative force applied to said member by said magnet means increasing exponentially with increasing deflection of said member in said one direction, and said two last-named means producing a net force-deflection characteristic for said member which is positive throughout said deflection range and has a maximum force peak at a predetermined point along said deflection range, whereby a snap action deflection of said member to the end of said range is produced in response to the application of said maximum force to said member, an elongated spring carrying one of said contact points and deflectable by said member to bring said one contact point into engagement with the other contact point, said elongated spring applying an additional positive force to said member resisting deflection of said member after a predetermined deflection thereof beyond said maximum force peak to bring said contact points into engagement, the additional positive force applied to said member by said elongated spring increasing linearly with increasing deflection of said member in said one direction beyond said maximum force peak and said elongated spring having a spring constant of such low value that no portion of the resultant force-deflection characteristic of said member has a force value exceeding said maximum force value, whereby said additional positive force is prevented from interfering with the snap action deflection of said member to the end of said range, and means for applying a variable deflecting force to said member the magnitude of which is independent of deflection of said member.

IVAR JEPSON.
LUDVIK J. KOCI.

REFERENCES CITED

The following references are of record in the file of this patent:

UNITED STATES PATENTS

| Number | Name | Date |
|---|---|---|
| Re. 16,940 | Massa | Apr. 24, 1928 |
| 730,371 | Hewlett | June 9, 1903 |
| 814,501 | Allen | Mar. 6, 1906 |
| 989,420 | Reichel | Apr. 11, 1911 |
| 1,222,720 | Bijur | Apr. 17, 1917 |
| 1,827,102 | Penn | Oct. 13, 1931 |
| 1,866,436 | Weston | July 5, 1932 |
| 1,927,346 | Lawrence | Sept. 19, 1933 |
| 2,014,385 | Lamb | Sept. 17, 1935 |
| 2,125,055 | Taliaferro | July 26, 1938 |
| 2,209,368 | Whittaker | July 30, 1940 |
| 2,283,270 | Laurenson | May 19, 1942 |
| 2,294,484 | Snavely et al. | Sept. 1, 1942 |